United States Patent
Motowaki

(10) Patent No.: US 9,896,273 B2
(45) Date of Patent: Feb. 20, 2018

(54) ARTICLE SUPPLY APPARATUS

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/493,629

(22) Filed: Apr. 21, 2017

(65) Prior Publication Data

US 2017/0305678 A1    Oct. 26, 2017

(30) Foreign Application Priority Data

Apr. 26, 2016  (JP) ................................ 2016-088152

(51) Int. Cl.
| | | |
|---|---|---|
| *B65G 47/02* | (2006.01) | |
| *B65G 27/04* | (2006.01) | |
| *B25J 9/00* | (2006.01) | |
| *B25J 9/16* | (2006.01) | |
| *B65G 27/24* | (2006.01) | |

(52) U.S. Cl.
CPC ............ *B65G 27/04* (2013.01); *B25J 9/0093* (2013.01); *B25J 9/1697* (2013.01); *B65G 27/24* (2013.01)

(58) Field of Classification Search
None
See application file for complete search history.

(56) References Cited

U.S. PATENT DOCUMENTS 9,669,432 B2 *  6/2017  McCarthy ............. B07C 5/3422
2006/0057239 A1  3/2006  Hariki et al.

FOREIGN PATENT DOCUMENTS

| JP | 2006082186 | 3/2006 |
| JP | 2015030543 | 2/2015 |

* cited by examiner

*Primary Examiner* — Kavel Singh
(74) *Attorney, Agent, or Firm* — Karceski IP Law, PLLC

(57) ABSTRACT

An article supply apparatus includes an inclined passage which inclines downwardly toward a predetermined direction, a vibration imparting device which vibrates the inclined passage, an article feeding device which feeds a plurality of articles to the upper end side of the inclined passage, a visual sensor which captures images of the articles on the inclined passage and which obtains information for identification of at least a position of each of the articles on the inclined passage, and a robot arm which picks up the articles one by one from the inclined passage by using the information obtained by the visual sensor and which supplies the picked-up articles to a predetermined supply destination.

6 Claims, 5 Drawing Sheets

ARTICLE SUPPLY APPARATUS

CROSS-REFERENCE TO RELATED APPLICATIONS

This application is based on and claims priority to Japanese Patent Application No. 2016-088152, filed on Apr. 26, 2016, the entire content of which is incorporated herein by reference.

FIELD OF THE INVENTION

The present invention relates to an article supply apparatus which supplies articles to predetermined supply destinations by picking up the articles one by one by using a robot arm.

BACKGROUND OF THE INVENTION

As this kind of article supply apparatus, an article supply apparatus which houses a plurality of articles in a bowl and transfers them to a rotating table from the bowl, which detects a position or posture of each of the articles on the rotating table by using a visual sensor, and which supplies the articles to predetermined destinations by picking up the articles one by one by using robot arms based on the detected result is known (See Japanese Unexamined Patent Application, Publication No. 2006-082186, for example).

And, an article supply apparatus which controls posture of each of the articles on a transportation passage provided in a bowl by vibrating the articles in the bowl so that the articles moves on the transportation passage, and which supplies the articles to a predetermined supply destination from the end side of the transportation passage is also known (See Japanese Unexamined Patent Application, Publication No. 2015-030543, for example).

SUMMARY OF THE INVENTION

An article supply apparatus according to a first aspect of the present invention includes an inclined passage which inclines downwardly toward a predetermined direction; a vibration imparting device which imparts vibration to the inclined passage; an article feeding device which feeds a plurality of articles to an upper end side of the inclined passage; a visual sensor which conducts an image capture of the plurality of articles on the inclined passage and which obtains information that enables identification of at least a position of each of the articles; and a robot arm which picks up the articles one by one from the inclined passage by using the information obtained by the visual sensor and which supplies the picked-up articles to a predetermined supply destination.

DESCRIPTION OF EMBODIMENTS

An article supply apparatus in accordance with a first embodiment of this present invention is described below with reference to the drawings.

Figure 1:
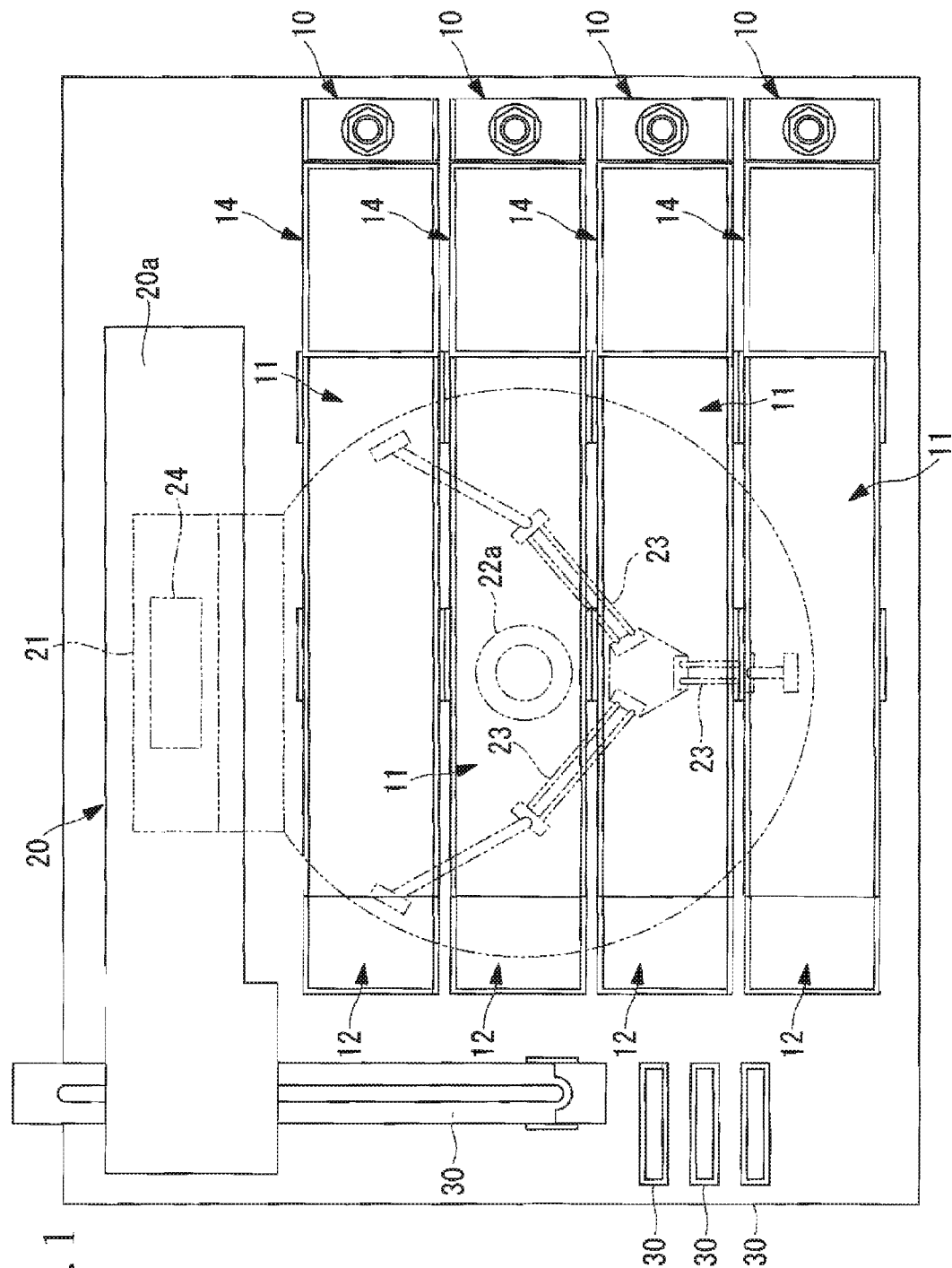
FIG. 1 is a schematic view showing a structure of an article supply apparatus according to a first embodiment of the present invention.

As shown in FIG. 1, this article supply apparatus comprises a plurality of article transportation devices 10 which are arranged in a horizontal direction, and a robot with a visual sensor 20 which is placed above the plurality of article transportation devices 10, and supplies the articles to respective article cartridges (supply destinations of the articles) 30.

Figure 2:
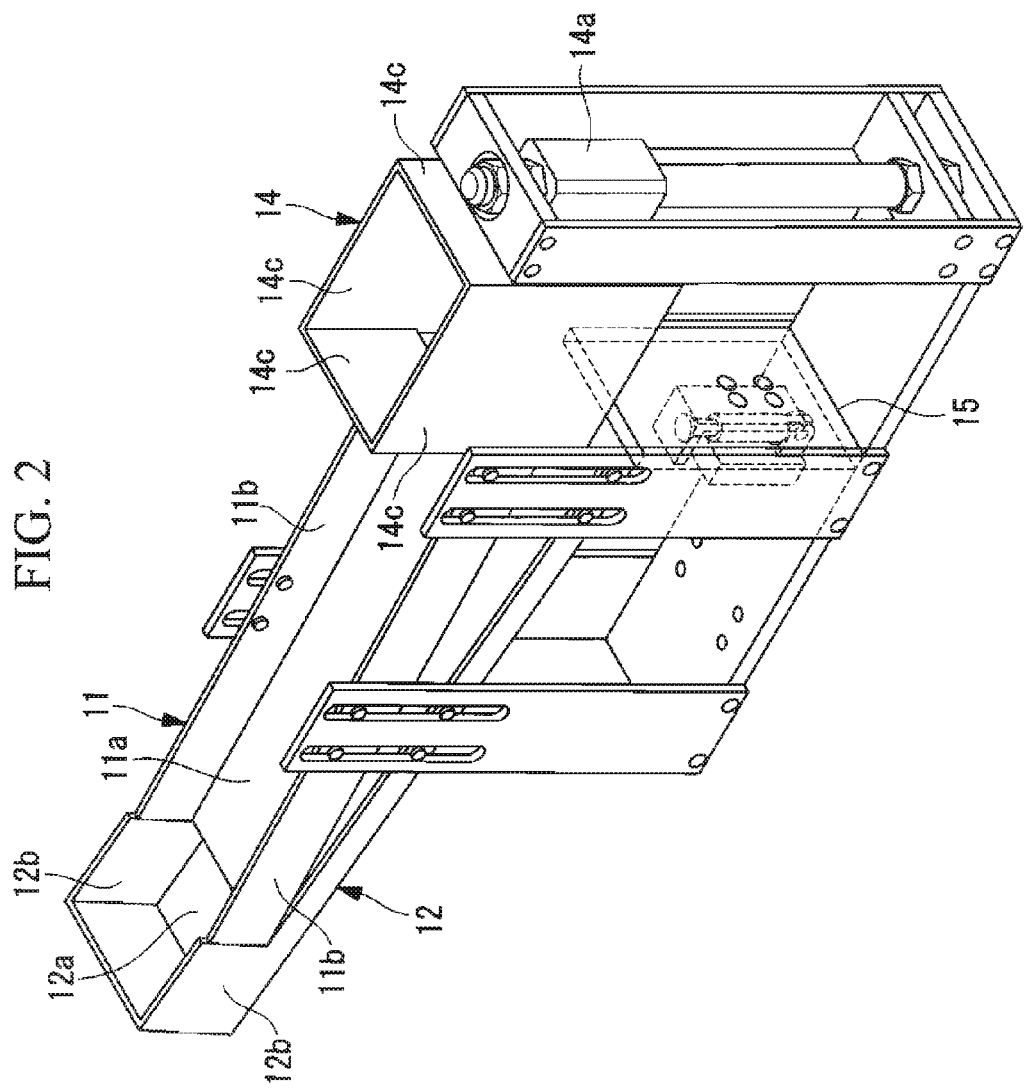
FIG. 2 is a perspective view showing an article transportation device of the article supply apparatus shown in FIG. 1.
Figure 3:
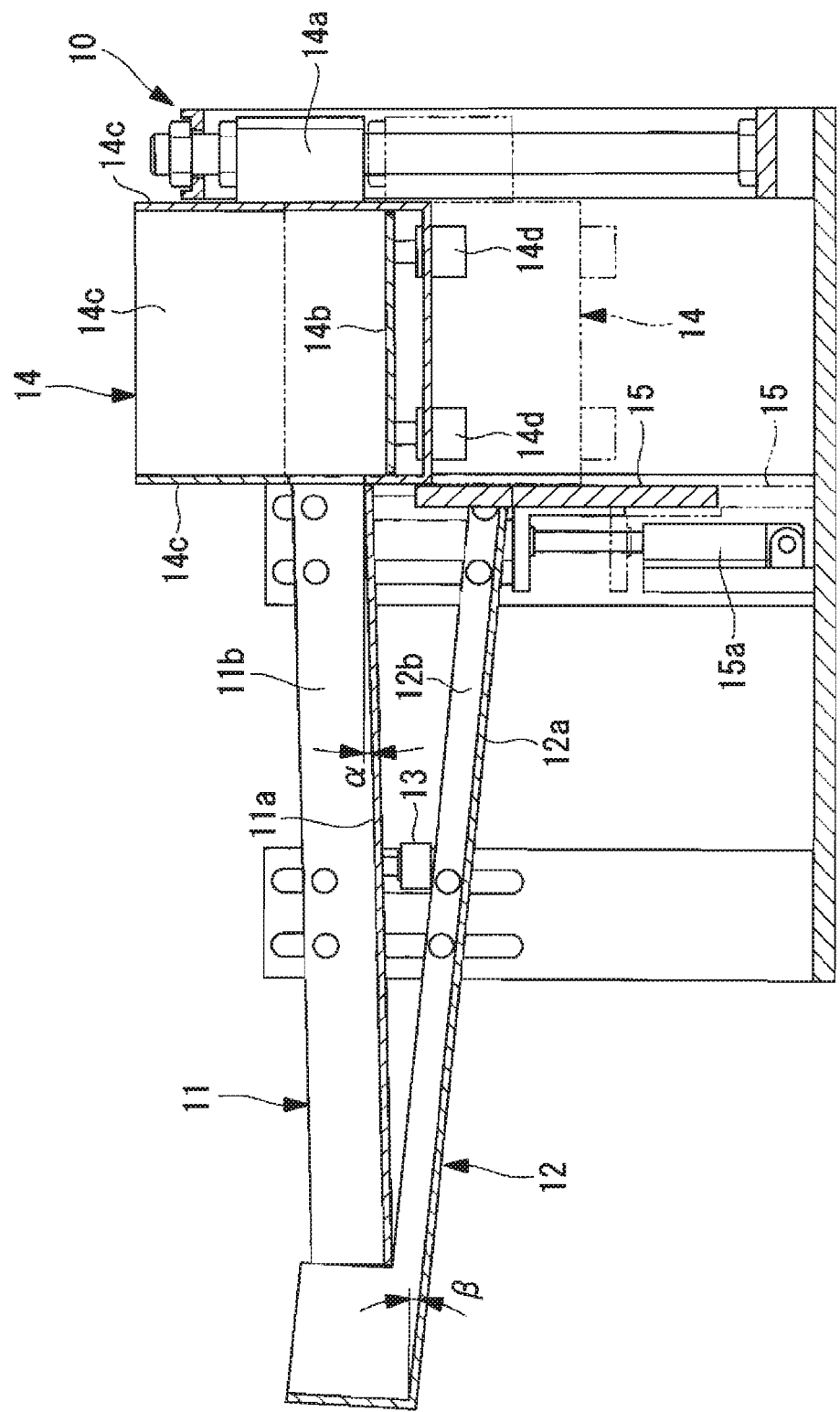
FIG. 3 is a sectional view showing the article transportation device shown in FIG. 2.

As shown in FIGS. 2 and 3, each article transportation device 10 comprises a first inclined passage 11 which inclines downwardly toward a predetermined direction (left direction in FIG. 2), a second inclined passage 12 as an article return passage which is placed below the first inclined passage 11, and which receives the articles dropped from the lower end of the first inclined passage 11 and returns the articles toward a direction opposite to the predetermined direction (right direction in FIG. 2), a vibration imparting device 13 which vibrates the first inclined passage 11, and an article feeding container 14 which feeds the articles to the upper end of the first inclined passage 11.

As shown in FIG. 3, the first inclined passage 11 is formed in a gutter shape which has a bottom surface 11a and a pair of side surfaces 11b, and the bottom surface 11a inclines at an inclination angle $\alpha$. The second inclined passage 12 is also formed in a gutter shape which has a bottom surface 12a and a pair of side surface 12b, and the bottom surface 12a inclines at an inclination angle $\beta$. The inclination angle $\beta$ is larger than the inclination angle $\alpha$, and preferably, the inclination angle $\beta$ is set so that the articles can move toward the lower end of the second inclined passage 12 without vibrating the second inclined passage 12.

The vibration imparting device 13 is configured to impart vibration which is generated from a known vibration generating device to the first inclined passage 11. As the vibration generating device, for example, a vibration generating device which comprises an electromagnet, an attracted part which is attracted by magnetic force of the electromagnet, an elastic member which holds the attracted part at a position which is apart by a predetermined distance from the electromagnet, and a power supply portion which supplies pulse power to the electromagnet can be used.

As shown in FIG. 13, the article feeding container 14 is lifted by a lifting device 14a which is formed by an air cylinder, an electric actuator such as an electric cylinder, and the like, the container is placed, when lifted, at an article feeding position which is indicated with solid lines in the figure, and is placed, when lowered, at an article collecting position which is indicated with two-dot chain lines in the figure.

The article feeding container 14 comprises a base plate 14b and four side walls 14c. An opening portion for feeding the article is provided in the side wall 14c at the first inclined passage side among the four side walls. Also, the base plate 14b moves in the vertical direction by base plate driving devices 14d such as air cylinders or the like.

By this, the articles in the article feeding container 14 are supplied to the upper end of the first inclined passage 11 by putting the plurality of articles in the article feeding container 14, placing the article feeding container 14 at the article feeding position, and lifting the base plate 14b by using the base plate driving devices 14d.

On the other hand, the article collection position is a position for collecting the articles which are discharged from the lower end side of the second inclined passage 12 and housing them in the article collection container 14.

The article transportation device 10 comprises a shutter 15 which is positioned at the lower end side of the second inclined passage 12 when the article feeding container 14 is placed at the article supply position.

For example, the shutter 15 is formed in a plate-like shape, and is moved in the vertical direction by a shutter moving device 15a which is composed of an air cylinder. In this embodiment, when the shutter 15 is moved upwardly by the shutter moving device, the shutter 15 is placed at a discharge prevention position (indicated with solid lines in FIG. 3) which is at the lower end side of the second inclined passage 12. When the shutter 15 is placed at the discharge prevention position, the articles are not discharged from the lower end side of the second inclined passage 12. On the other hand, when the shutter 15 is moved downwardly by the shutter moving device 15a, the articles are discharged from the lower end side of the second inclined passage 12.

The robot with the visual sensor 20 has a robot body 21 which is supported by a frame 20a, a visual sensor 22 which is placed in the robot body 21, three robot arms 23 which are supported by the robot body 21, and a robot controller 24 which controls the robot arms 23.

Figure 4:
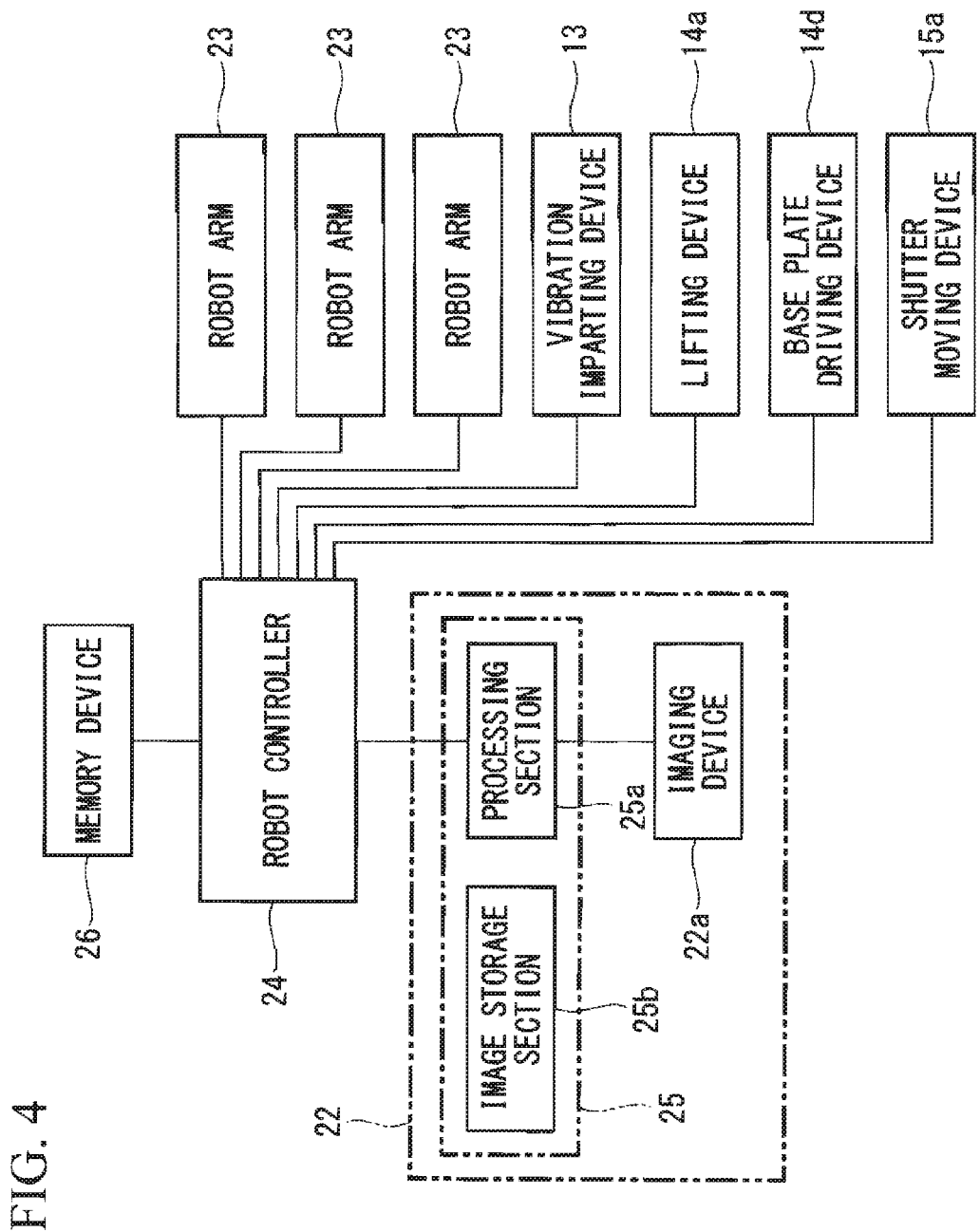
FIG. 4 is a schematic block diagram of the article supply apparatus of this embodiment.

As shown in FIG. 4, for example, the visual sensor 22 has an imaging device 22a which captures images of the plurality of articles on the first inclined passages 11 of the plurality of article transportation devices 10, and an image processing section 25. The images captured by the imaging device 22a are subjected to image processing by the image processing section 25, and information on the basis of the processed images is sent to the robot controller 24 which is placed in the robot body 21.

The image processing section 25 has a processing section 25a which performs known image processing such as static thresholding process, dynamic thresholding process, or the like on the captured images, and an image storage section 25b which stores the images after image processing. The processing section 25a is a computer which has a CPU and a memory, and performs the image processing on the basis of a predetermined program stored in the memory. The processing section 25a may send the images after the image processing as information on the basis of the processed images to the robot controller 24, or it may send location information of feature points (portions having distinctive shapes) of the plurality of articles shown in each of the images after image processing as information on the basis of the processed images to the robot controller 24.

The robot controller 24 operates on the basis of a program stored in a memory device 26, and according to the information based on the processed images and reference component information stored in the memory device 26, the robot controller 24 discriminates the articles which are located at positions capable of being picked up by the robot arms, and each of which has posture or a shape capable of being picked up by the robot arms. In addition, the robot controller 24 controls a plurality of servomotors for moving the robot arms 23 respectively. With this configuration, the articles are picked up one by one from the first inclined passages 11 by the robot arms 23, and the picked up articles are supplied to the corresponding article cartridges 30.

Moreover, in this present embodiment, the robot controller 24 is configured to operate based on the program so as to send control signals to the vibration imparting devices 13, the lifting devices 14a, the base plate driving devices 14d, and the shutter moving device 15a, and thereby controls these devices and the respective robot arms 23.

Figure 5:
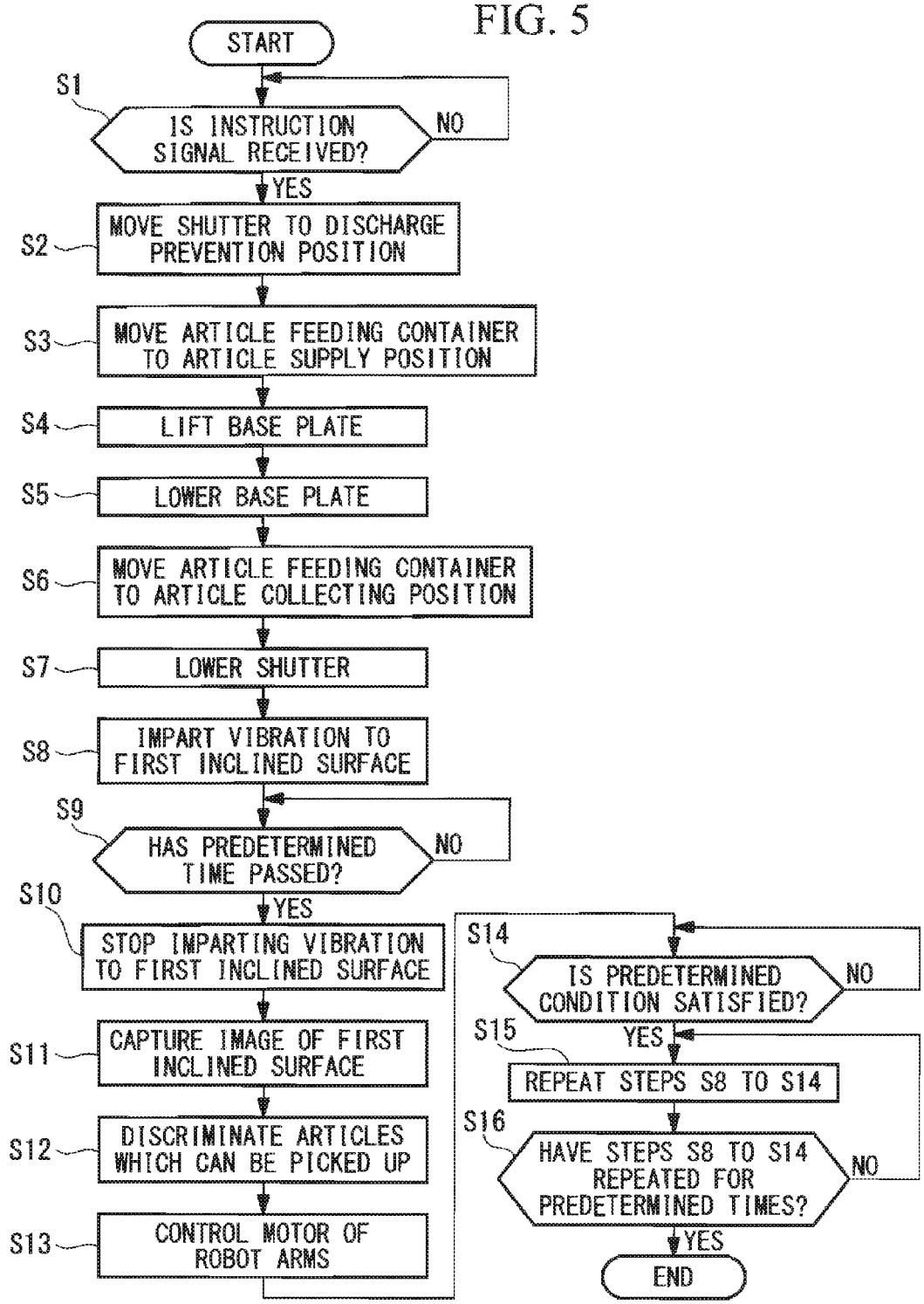
FIG. 5 is a flowchart showing control performed by a robot controller of the present embodiment.

One example of the operation of the robot controller 24 is explained below with reference to a flowchart shown in FIG. 5. Here, reference numbers, No. 1 to No. 4, are given to the article transportation devices 10, respectively.

First, an operator inputs, by an input device, an instruction for picking the articles up from the article transportation device 10 (No. 1), and for supplying them to the corresponding article cartridge 30. When the instruction signal is received by the robot controller 24 (step S1), regarding the article transportation device 10 (No. 1), while the shutter 15 is kept in a state where the shutter 15 is located at the discharge prevention position by the shutter moving device 15a (step S2), the article feeding container 14 is moved to the article feeding position by the lifting device 14a (step S3), and the base plate 14d is lifted by the base plate moving devices 14d (step S4). By this, the plurality of articles in the article feeding container 14 are placed on the upper end side of the first inclined passage 11. Note that the lifting amount and inclined degree of the base plate 14d can be adjusted by the base plate driving devices 14d.

Next, the base plate 14b is lowered by the base plate driving devices 14d (step S5), and at the same time, the article feeding container 14 is lowered by the lifting device 14a so as to be moved to the article collection position (step S6). Also, the shutter 15 is moved downwardly by the shutter moving device 15a (step S7). By this, when the articles are placed on the second inclined passage 12, the articles will be discharged to the article feeding container 14 from the lower end side of the second inclined passage 12.

Next, the robot controller 24 vibrates the first inclined passage 11 by the vibration imparting device 13 (step S8). By this operation, the plurality of articles are moved toward the lower end side of the first inclined passage 11. As a predetermined time has passed after conducting the step S8 (step S9), the robot controller 24 controls the vibration imparting device 13 to stop imparting vibration (step S10). In this state, the robot controller 24 controls the visual sensor 22 to capture an image of the first inclined passage 11 (step S11), and then discriminate the articles which are located at the places capable of being picked up by the robot arms, and each of which has posture or a shape capable of being picked up by the robot arms according to the information based on the processed image sent by the image processing section 25a and the reference component information stored in the memory device 26 (step S12).

Then, a plurality of motors attached to the robot arms 23 are controlled so that the articles which are located at the places capable of being picked up, and each of which has posture or a shape capable of being picked up are picked up one by one and supplied to the corresponding article supply cartridge 30 (step S13).

Further, for example, when a predetermined condition such as a condition of supplying a predetermined amount of articles to the article supply device 30, a condition of having passed a predetermined time, a condition of presence of no article which is capable of being picked up on the first inclined passage 11, or the like is satisfied, the step is proceeded to the next step (step S14). And, the robot controller 24 conducts the steps S8 to S14 repeatedly (step 15), the steps S8 to S14 are conducted repeatedly for a predetermined times (step 16).

Although the above description if for the article transportation device 10 (No. 1), the article transportation devices 10 (No. 2 to No. 4) are also controlled by the robot controller 24 in the same or a similar way.

Although the same kind of article can be fed in the article feeding containers 14 of the article transportation devices 10 (No. 2 to No. 4), it becomes possible to select an article just by selecting the article transportation device 10 when different kinds of articles are put in the containers.

As described above, in this embodiment, the article on the first inclined passage 11 which inclines toward the predetermined direction is picked up by the robot arms 23 and supplied to the article cartridge 30. Therefore, it becomes possible to reduce an area occupied by one kind of articles. Also, since the first inclined passage 11 inclines toward the predetermined direction, if the plurality of first inclined passages 11 are aligned as shown in FIG. 1, the plurality of first inclined passages 11 can be provided in a small space.

Moreover, by feeding different kinds of articles to the respective inclined passages 11, even when many kinds of articles are handled, a wide space will not be required, thus, a range of articles which can be handled by one set of the robot arms 23 can be broadened. In other words, it becomes possible to widen the range of articles handled by the set of the robot arms 23 while saving space.

Also, in this embodiment, the robot controller 24 is employed to control the vibration imparting device 13, the imaging device 22a of the visual sensor, and the robot arms 23 which controls the robot arms 23, while the robot controller 24 does not operate the vibration imparted by the vibration imparting device 13, the robot controller 24 makes the visual sensor 22 to capture the images of the articles on the first inclined passages 11, and makes the robot arms 23 to pick up the articles. This configuration can reduce a possibility of the articles being damaged and broken by reducing a period of time during which the vibration is imparted to the articles. And, since the plurality of the articles are stopped at detected positions when picked up by the robot arms, efficiency for supplying the articles by the robot arms is also improved.

Further, the second inclined passage 12 is configured to be located below the first inclined passage 11 and to receive the articles dropped from the lower end side of the first inclined passage 11, and to return the articles to the direction opposite to the predetermined direction. Also, the article feeding container 14 is configured to receive the articles from the lower end side of the second inclined passage 12, and to supply the received articles to the upper end side of the first inclined passage 11. With this configuration, since the articles which are moved to the lower end side of the first inclined passage 11 are sent back to the upper end side of the first inclined passage 11 via the second inclined passage 12 which is placed below the first inclined passage 11, it is extremely advantageous to align the plurality of first inclined passages 11 in a small space.

Also, since the second inclined passage 12 is a gutter shaped inclined passage which inclines downwardly toward the direction opposite to the predetermined direction with an inclination angle larger than that of the first inclined passage 11, the articles on the second inclined passage 12 can be moved faster than that on the first inclined passage 11. Therefore, it is advantageous for shortening a time period required for feeding the articles to the upper end side of the first inclined passage 11, and for securing the amount of articles supplied to the upper end side of the first inclined passage 11.

In addition, this article transportation device 10 comprises the article feeding container 14, the lifting device 14a which moves the article feeding container 14 to the article feeding position for feeding the articles to the upper end side of the first inclines passage 11 and the article collection position for receiving the articles from the lower end of the second inclined passage 12, and the shutter 15 which can be provided at the discharge prevention position at the lower end side of the second inclined passage 12 so as to prevent the articles from being discharged from the second inclined passage 12 when the article feeding container 14 is placed at a position other than the article collection position. With this configuration, since the articles are moved to the upper end side of the first inclined passage 11 from the lower end side of the second inclined passage 12 by the article feeding container 14 which moves up and down, an area occupied by the article transportation device 10 can be made small.

Moreover, the article feeding container 14 comprises the base plate 14b which is movable in the vertical direction so as to adjust a capacity of the article feeding container 14, and the inclination angle of the base plate 14b can be adjusted by adjusting the lifting amount of the base plate 14b by the base plate driving devices 14d. Thus, it becomes possible to adjust the amount of articles which is supplied to the upper end side of the first inclined passage 11 from the article feeding container 14, and to adjust detection of the visual sensor 22 and pick-up efficiency of the robot arms 23.

Further, since the robot controller 24 is configured to control the lifting device 14a in addition to the vibration imparting device 13, the visual sensor 22, and the robot arms 23, the control of the lifting device 14a to be interlocked with the vibration imparting device 13, the visual sensor 22, and the robot arms 23 can be facilitated, which is advantageous for optimizing the amount of circulating articles, timing for feeding the articles to the upper end side of the first inclined passage 11, and the like.

In this embodiment, the second inclined passage 12 is the inclined passage whose inclination angle is larger than that of the first inclined passage 11 so that the articles which are dropped from the lower end side of the first inclined passage 11 are moved to the article feeding container 14. In another embodiment, the articles which are dropped from the lower end side of the first inclined passage 11 can also be moved to the article feeding container 14 by a belt conveyer which is provided below the first inclined passage 11. In this case, the belt conveyer functions as the article return passage.

Also, the articles may also be transported on the second inclined passage 12 toward the lower end side thereof by vibrating the second inclined passage 12 in a similar manner as the first inclined passage 11.

In this embodiment, in order for the robot controller 24 to discriminate the articles which are located at the positions capable of being picked up by the robot arms 23 each of which has posture or a shape capable of being picked up by the robot arms 23, the visual sensor 22 obtains information for identifying the position, the posture, and the shape of each of the articles. In another embodiment, the robot arms 23 can pick up the articles even when the visual sensor 22 obtains the information which indicate the position and the posture of each of the articles, and the robot controller 24 discriminates the articles which are at the positions capable of being picked up by the robot arms 23 and each of which has the posture capable of being picked up. In addition, the robot arms 23 may be able to pick up the articles only by discriminating the articles at the positions capable of being picked up by the robot arms 23 by the robot controller 24.

Also, in this embodiment, the articles are moved to the upper end side of the first inclined passage 11 from the lower end side of the second inclined passage 12 by using the articles supply container 14 which moves up and down. In another embodiment, instead of employing the articles supply container 14, it is possible to employ a known spiral conveyer, a known belt conveyer to which the articles are attracted by a magnet or the like, or other devices for moving the articles to the upper end side of the first inclined passage 11 from the lower end side of the second inclined passage 12. In this case, the spiral conveyer or the belt conveyer functions as an article feeding device which feeds the articles to the upper end side of the first inclined passage.

The inventor has arrived at the following aspects of the present invention.

An article supply apparatus according to a first aspect of the present invention comprises an inclined passage which inclines downwardly toward a predetermined direction; a vibration imparting device which imparts vibration to the inclined passage; an article feeding device which feeds a plurality of articles to an upper end side of the inclined passage; a visual sensor which conducts an image capture of the plurality of articles on the inclined passage and which obtains information that enables identification of at least a position of each of the articles; and a robot arm which picks up the articles one by one from the inclined passage by using the information obtained by the visual sensor and which supplies the picked-up articles to a predetermined supply destination.

According to this aspect, since the robot arm picks up the articles on the inclined passage which inclines downwardly toward the predetermined direction and supplies the picked-up articles to the predetermined supply destination, a space used for one kind of the article can be made small. Also, since the inclined passage has downward inclination toward the predetermined direction, it is possible to provide a plurality of inclined passages in a small space when the predetermined direction is set to be a longitudinal direction of the inclined passage, and, for example, by arranging the plurality of inclined passages in a direction perpendicular to the longitudinal direction with each other. In addition, by feeding different kinds of articles to the respective inclined passages, a wide space will not be required when handling many kinds of articles, and it becomes possible to broaden a range of articles which can be handled by one set of robot arms.

In the above aspect, it is preferable that the article supply apparatus further comprises a controller which controls the vibration imparting device, the visual sensor, and the robot arms, wherein the controller makes the visual sensor conduct the image capture and makes the robot arm pick up the articles while stopping the vibration imparting device from imparting vibration.

With such configuration, it becomes possible to reduce a possibility of the articles being damaged and broken by reducing a time period of vibrating the articles. Also, since the plurality of the articles are stopped at detected positions when picked up by the robot arm, efficiency for supplying the articles by the robot arm is also improved.

In the aforementioned aspect, it is preferable that the article supply apparatus further comprises an article return passage which is located below the inclined passage, which receives the articles dropped from a lower end side of the inclined passage, and which returns the articles toward the opposite side of the predetermined direction, wherein the article feeding device is configured to receive the articles from a lower end side of the article return passage, and to feed the received articles to the upper end side of the inclined passage.

With such configuration, since the articles which are moved toward the lower end side of the inclined passage are returned to the upper end side of the inclined passage via the article return passage which is located below the inclined passage, it is extremely advantageous for providing the plurality of inclined passages in a small space.

In the aforementioned aspect, the article return passage preferably be a gutter shaped inclined passage which inclines downwardly toward the direction opposite to the predetermined direction with an inclination angle larger than that of the inclined passage.

With this configuration, since it becomes possible to transport the articles on the article return passage faster than those of on the inclined passage, it is advantageous for shortening a time period required for feeding the articles to the upper end side of the inclined passage, and for securing the amount of articles supplied to the upper end side of the inclined passage.

In the aforementioned aspect, the article feeding device preferably includes an article feeding container, a lifting device which moves the article feeding container to an article feeding position for feeding the article to the upper end side of the inclined passage and to an article collecting position for receiving the articles from the lower end of the article return passage, and a shutter which is positioned at a discharge prevention position located at a lower end side of the article return passage so as to prevent the articles from being discharged from the article return passage when the article feeding container is located at a position other than the article collecting position.

This configuration is advantageous for making the space which is occupied by this apparatus smaller, because the articles are moved to the upper end side of the inclined passage from the lower end side of the article return passage by the article feeding container which moves up and down.

In the aforementioned aspect, the article feeding container preferably comprises a base plate which is movable in a vertical direction so as to adjust a capacity of the article feeding container, and a base plate angle adjusting mechanism which adjusts an inclination angle of the base plate.

With this configuration, it is possible to adjust amount of the articles supplied to the upper end side of the inclined passage from the article feeding container, and to adjust detection of the visual sensor and pick-up efficiency of the robot arm.

In the aforementioned aspect, the controller is preferably configured to control the lifting device as well.

Since the controller controls the lifting device as well as the vibration imparting device, visual sensor, and the robot arm, the control of the lifting device which is interlocked with the vibration imparting device, the visual sensor, and the robot arm can be facilitated, and it becomes advantageous for optimizing the amount of circulating articles, timing for feeding the articles to the upper end side of the inclined passage, and the like.

According to the aforementioned aspects, a range of articles handled by one set of robot arms can be broadened while saving space.

The invention claimed is:
1. An article supply apparatus, comprising:
an inclined passage inclined downwardly toward a predetermined direction;
a vibration imparting device imparting vibration to the inclined passage;
an article feeding device feeding a plurality of articles to an upper end side of the inclined passage;
a visual sensor capturing an image of the plurality of articles on the inclined passage and obtaining information that enables identification of at least a position of each of the articles;

a robot arm picking up the articles one by one from the inclined passage by using the information obtained by the visual sensor and supplying the picked-up articles to a predetermined supply destination; and an article return passage located below the inclined passage, receiving the articles dropped from a lower end side of the inclined passage and returning the articles toward the opposite side of the predetermined direction, wherein the article feeding device receives the articles from a lower end side of the article return passage and feeds the received articles to the upper end side of the inclined passage.

2. The article supply apparatus according to claim 1, further comprising:

a controller controlling the vibration imparting device, the visual sensor, and the robot arms, wherein the controller instructs the visual sensor to conduct the image capture and instructs the robot arm to pick up the articles while stopping the vibration imparting device from imparting vibration.

3. The article supply apparatus according to claim 1, wherein the article return passage is gutter shaped and inclines downwardly toward the opposite side of the predetermined direction and has an inclination angle larger than that of the inclined passage.

4. The article supply apparatus according to claim 3, wherein the article feeding device includes an article feeding container, a lifting device moving the article feeding container to an article feeding position for feeding the article to the upper end side of the inclined passage and to an article collecting position for receiving the articles from the lower end of the article return passage, and a shutter positioned at a discharge prevention position located at a lower end side of the article return passage preventing the articles from being discharged from the article return passage when the article feeding container is located at a position other than the article collecting position.

5. The article supply apparatus according to claim 4, wherein the article feeding container comprises a base plate movable in a vertical direction to adjust a capacity of the article feeding container, and a base plate angle adjusting mechanism to adjust an inclination angle of the base plate.

6. The article supply apparatus according to claim 4, wherein the controller controls the lifting device.

* * * * *